US007002757B2

(12) United States Patent
Sato

(10) Patent No.: US 7,002,757 B2
(45) Date of Patent: Feb. 21, 2006

(54) SINGLE-FOCUS LENS FOR ELECTRONIC STILL CAMERAS

(75) Inventor: Kenichi Sato, Ageo (JP)

(73) Assignee: Fujinon Corporation, Saitama (JP)

(*) Notice: Subject to any disclaimer, the term of this patent is extended or adjusted under 35 U.S.C. 154(b) by 742 days.

(21) Appl. No.: 10/225,359

(22) Filed: Aug. 22, 2002

(65) Prior Publication Data

US 2003/0112359 A1    Jun. 19, 2003

(30) Foreign Application Priority Data

Sep. 26, 2001    (JP) ............... 2001-294141

(51) Int. Cl.
G02B 9/34    (2006.01)
G02B 9/12    (2006.01)
H04N 2/225    (2006.01)

(52) U.S. Cl. ............... 359/771; 348/342; 359/784

(58) Field of Classification Search ............... 348/340, 348/342; 359/771, 772, 773, 774, 784, 796, 359/797
See application file for complete search history.

(56) References Cited

U.S. PATENT DOCUMENTS 6,724,547 B1 *    4/2004  Sato ............... 359/785
6,876,500 B1 *    4/2005  Sato ............... 359/717
6,882,483 B1 *    4/2005  Sato ............... 359/708
6,930,841 B1 *    8/2005  Sato ............... 359/784

FOREIGN PATENT DOCUMENTS

JP    9-289644    11/1997
JP    11-84232    3/1999

* cited by examiner

Primary Examiner—David N. Spector
(74) Attorney, Agent, or Firm—Arnold International; Bruce Y. Arnold

(57) ABSTRACT

A single-focus lens for an electronic still camera is formed of at least one meniscus lens element that is placed on the object side of a stop, with at least one surface of this meniscus lens element having a curvature such that light rays that pass through the stop are incident the surface substantially normally for all field angles, and an infrared-blocking coating is provided on the surface. Preferably, two specified conditions are satisfied to ensure that rays which are incident onto the coating are not adversely affected by the coating, thereby preventing color variations of objects which otherwise would occur.

2 Claims, 3 Drawing Sheets

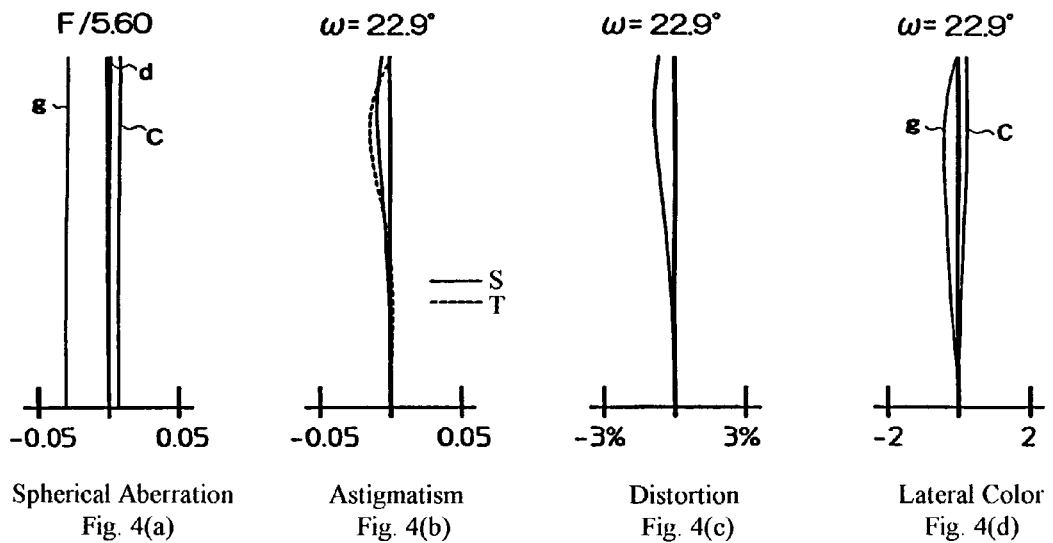
Spherical Aberration
Fig. 4(a)
Astigmatism
Fig. 4(b)
Distortion
Fig. 4(c)
Lateral Color
Fig. 4(d)
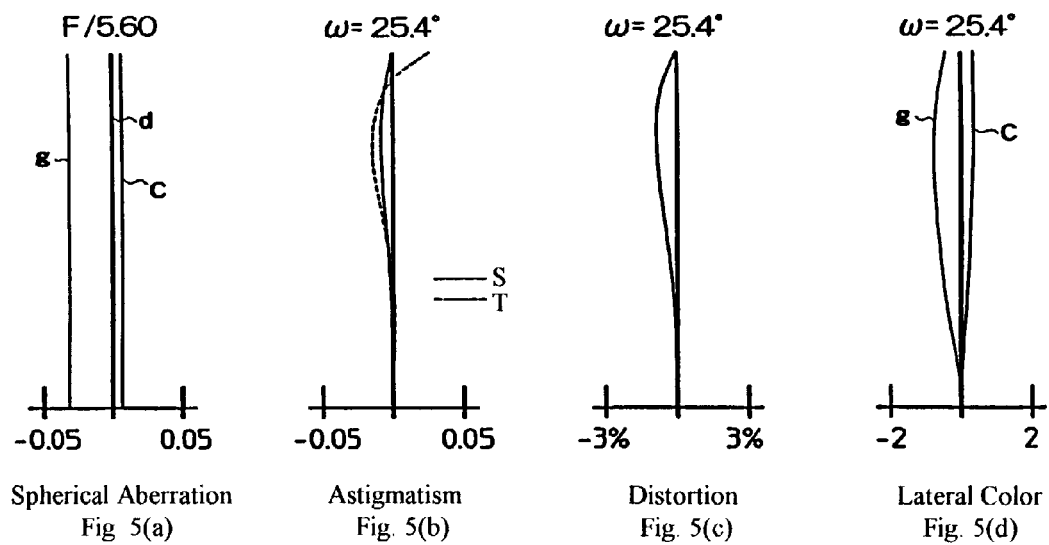
Spherical Aberration
Fig. 5(a)
Astigmatism
Fig. 5(b)
Distortion
Fig. 5(c)
Lateral Color
Fig. 5(d)

SINGLE-FOCUS LENS FOR ELECTRONIC STILL CAMERAS

BACKGROUND OF THE INVENTION

Digital electronic still cameras are rapidly becoming popular. With this kind of digital camera, by using a personal computer, one can easily perform processing of photographed image data. Due to advances in image sensors and market demand for more compact and inexpensive cameras, the need for miniaturization and price reduction of lenses for such cameras has become especially urgent.

Because CCD detector arrays (i.e., image sensor chips) used in electronic still cameras generally have properties which are highly sensitive to wavelengths on the infrared-side of the visible spectrum, there is a tendency for images of objects to be blurred. Therefore, a conventional construction has been adopted wherein an element such as an infrared-blocking filter is inserted in the imaging system in order to obtain clear images. For example, Japanese Laid Open Patent Publication H11-84232 describes a wide-angle lens having a construction wherein an infrared-blocking filter is placed between the photographic lens system and a CCD detector array in order to obtain clear images.

However, an infrared-blocking filter has become a rather expensive component in digital cameras where rapid price reductions have been occurring. Also, the need to secure sufficient space for placing an infrared-blocking filter results in decreasing the compactness of a camera lens which employs a separate element to serve as an infrared-blocking filter. Therefore, in order to design an imaging system which is low in cost and more compact, a construction as described in Japanese Laid Open Patent Publication H9-289644 has been proposed wherein infrared light is blocked by using an infrared-blocking coating applied to a lens surface rather than providing a separate infrared-blocking filter.

However, when using such an infrared-blocking coating, a problem tends to arise in that color reproducibility degrades with increasing field angles, due to the larger angles of incidence of the light onto the image sensor. The electronic still camera described in Japanese Laid Open Patent Publication H9-289644 is constructed such that a correction for color reproducibility can be performed using signal processing software. However, from the viewpoint of miniaturization and cost reduction, instead of this kind of complicated construction, lenses of simpler construction and better color reproducibility are desired.

Also, although it is not regarded as a problem in the conventional example where an infrared-blocking filter is used, there are cases where a ghost phenomenon occurs due to light being reflected by an infrared-blocking coating which then reaches the image surface. This phenomenon occurs more easily when an infrared-blocking coating is used rather than when a separate filter element is used. Thus, in a lens for an electronic still camera that uses an infrared-blocking coating, suppression of ghost images is strongly desired.

BRIEF SUMMARY OF THE INVENTION

The object of the present invention is to provide a single-focus photographic lens for use in an electronic still camera, with the lens having a simple construction and good color reproducibility, and which reduces the ghost phenomenon by using an infrared-blocking coating on a surface of the lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4(a)–4(d) show various aberrations of a single-focus lens for electronic still cameras according to Embodiment 1; and FIGS. 5(a)–5(d) show various aberrations of a single-focus lens for electronic still cameras according to Embodiment 2.

DETAILED DESCRIPTION

Figure 1A:
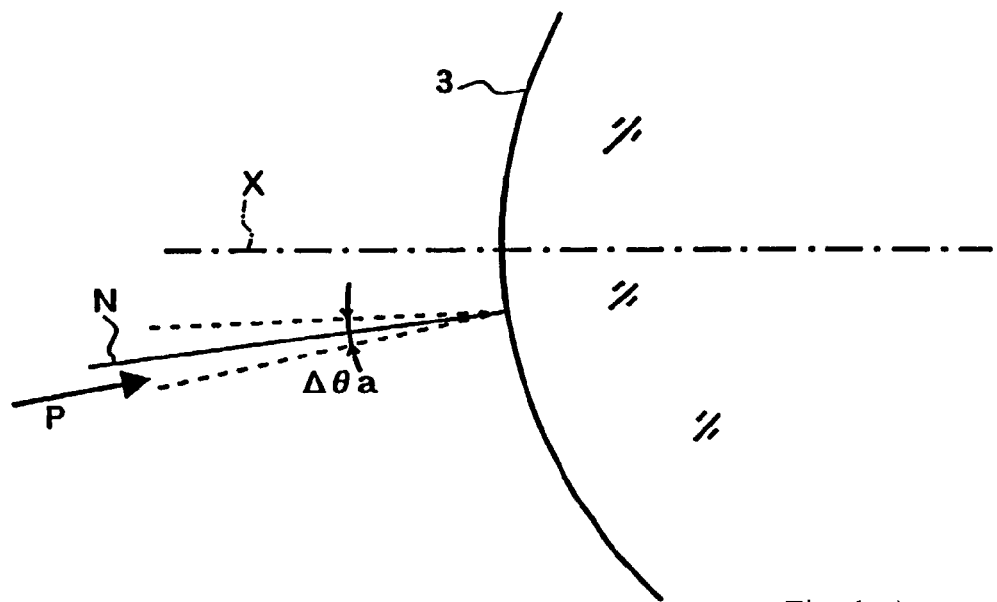
FIGS. 1(a) and 1(b) show the relationship between an infrared-blocking coating surface and an incident light beam, with FIG. 1(a) illustrating incident principal rays and FIG. 1(b) illustrating incident marginal rays.

The present invention relates to a single-focus lens that preferably is used in digital cameras, especially a single-focus lens for electronic still cameras equipped with an infrared-blocking coating.

The single-focus lens for electronic still cameras of the present invention is characterized by the fact that at least one meniscus lens element is placed on the object side of a stop, with at least one surface of the meniscus lens having a surface curvature so that the surface is substantially perpendicular to incident light which passes through the stop for all angles of view. This same surface is provided with an infrared-blocking coating.

Furthermore, it is preferred that the single-focus lens for electronic still cameras be configured so that it satisfies the following Conditions (1) and (2):

| | |
|---|---|
| $\Delta\theta a < 6°$ | Condition (1) |
| $\Delta\theta b < 7°$ | Condition (2) | where $\Delta\theta a$ is the maximum deviation angle, throughout all field angles, between the principal ray of a light flux that is incident onto the lens surface having the infrared-blocking coating thereon and which passes through the stop and a line normal to the same lens surface at the same point of incidence as the principal ray; and $\Delta\theta b$ is the maximum deviation angle between a marginal ray in the central light flux that passes through the stop and is incident onto the lens surface having an infrared-blocking coating thereon and a line that is normal to the same lens surface at the same point of incidence as the marginal ray.

The present invention will first be described in general terms, with reference to the drawings.

The single-focus lens for electronic still cameras of the present invention is formed of the following lens elements, in order from the object side: a first lens element $L_1$ of positive refractive power having a meniscus shape with is convex surface on the object side; a second lens element $L_2$ which has almost no power but has a convex surface on the image side and which corrects for aberrations; a stop 2; a third lens element $L_3$ of positive refractive power having a meniscus shape with its convex surface on the image side; and a fourth lens element $L_4$ which has almost no power but has a convex surface on the object side and which corrects for aberrations. The single focus lens serves to form a high quality image centered at the point P on the optical axis X, with I being a cover glass of an image sensor chip.

In this single-focus lens for electronic still cameras, an infrared-blocking coating is placed on the object-side surface of the first lens element $L_1$ (hereinafter, this lens surface is termed the coated surface 3. The coated surface 3 is made with a curvature such that the coated surface 3 is substantially perpendicular to the incident rays of light which pass through the stop and form an image for all field angles. The term "substantially perpendicular" here refers to the surface normal and the incident ray making an angle 10° or less.

Also, this single-focus lens for electronic still cameras is configured so that it preferably satisfies the above Conditions (1) and (2).

Figure 1B:
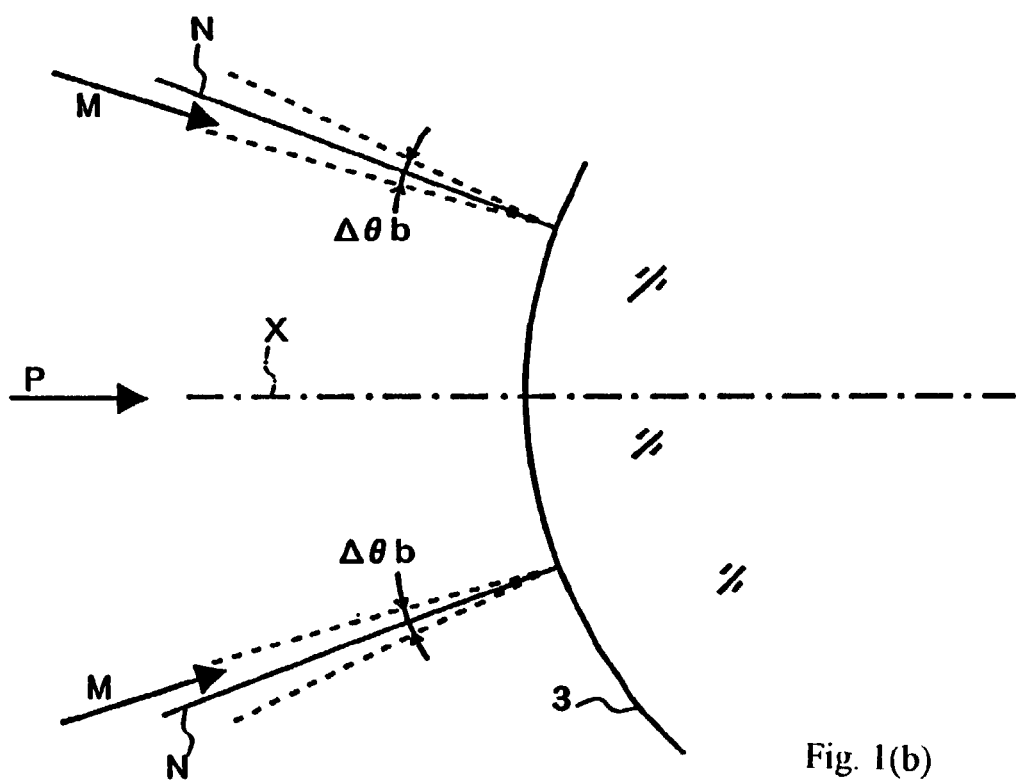

FIGS. 1(a) and 1(b) will be used to explain Conditions (1) and (2), with FIG. 1(a) being relevant to Condition (1) and FIG. 1(b) being relevant to Condition (2). In both FIGS. 1(a) and 1(b), the solid line N is a line that is normal to an arbitrary point of incidence onto the coated surface 3, and X is the optical axis of the coated surface 3. In FIG. 1(a), the dotted lines on either side of the line N indicate the maximum deviation angle $\Delta\theta a$ from the solid line N of a principal ray P of a light flux that is incident to the coated surface 3 at the same point of incidence as the solid line N for light passing through the stop to the image surface. As regulated by Condition (1), $\Delta\theta a$ is made to be less than 6°. In other words, this range of angles must be satisfied at all field angles. In FIG. 1(b), the solid line M is a marginal ray of a light flux having a deviation angle within the range of angles $\Delta\theta b$, shown by the dotted lines. The principal ray of this light flux, among the light fluxes incident onto the coated surface 3, approximately coincides with the optical axis X. As regulated by Condition (2), $\Delta\theta b$ is made to be an angle within 7° from the normal line N. In other words, the curvature of the coated surface 3 is such that Condition (2) is satisfied.

By thus regulating the shape of the coated surface 3 in relation to the incident angles of the incident light fluxes which pass through the stop so as to form an image of an object, good color reproducibility can be achieved. Namely, as mentioned above, because the properties of an infrared-blocking coating change in accordance with the angle of incidence of a ray onto the coated surface 3, degradation of the color reproducibility occurs. In the present invention, the surface shape of the coated surface 3 is made to have a curvature such that it is substantially perpendicular to the incident light beam from all angles of view. By configuring the surface curvature so that the incident light beam for all field angles is substantially perpendicular to the coated surface 3, the coated surface 3 no longer degrades the color reproducibility of the formed images.

Conditions (1) and (2) regulate the shape of the coated surface 3 so that the surface is substantially perpendicular to the incident light which contributes to images formed by the lens system for all field angles. Namely, by satisfying both Conditions (1) and (2), color reproducibility can be obtained with virtually no difficulty, due to all rays which form the image being substantially normal to the coated surface when incident thereon. For both conditions, when the upper limit value is exceeded, the spectral property change of the infrared-blocking coating between a central ray and a peripheral ray becomes too large, degrading the color reproducibility.

As indicated above, by using an infrared-blocking coating applied to a lens surface, cost reduction and miniaturization are achieved as compared with optical systems that use a separate infrared-blocking filter. Furthermore, by means of the present invention, because good color reproducibility is achieved with a simple construction, additional cost reduction and miniaturization can be achieved as compared with conventional examples which perform color correction using signal processing software.

Next, the effect of reducing ghost phenomena by means of the present invention is explained. Because a filter which blocks infrared light generally has a large reflectance to visible light as well, ghost images often occur in prior art lenses which employ such an infrared-blocking filter within the lens system. These ghost images often appear reddish in color.

According to the present invention, by using a coated surface 3 on the object side of the stop 2, the amount of reflected light within the lens system is decreased. In addition, the amount of reflected light that reaches the image surface can be made small, since the stop 2 tends to block most of the light that is reflected by a coating on the object side of the stop. If a coated surface 3 is placed on the image side of the stop, the proportion of reflected light that reaches the image surface increases. Thus, by placing the coated surface 3 on the object side of the stop 2, even if the amount of reflected light increases, the probability the reflected light will reach the image surface is reduced. By this means, a construction is provided which makes ghost phenomena less likely to occur. Furthermore, even if ghost phenomena occur, the intensity of the ghost light is small.

The coated surface 3 may be formed on any surface on the object side of the stop 2. Regardless of whether the coated surface is a concave surface on the object side or on the image side of a lens, a certain effect can be obtained. However, it is desirable that the coated surface be formed on a surface that is as far as possible from the stop 2. This is the case because the farther the surface is from the stop 2, the smaller the amount of undesirable, reflected light transmits the stop 2. Thus, the probability that strong reflected light will reach the image surface is reduced, thus reducing the influence of ghost phenomena.

Also, by forming the coated surface 3 on one surface of a meniscus lens element, because the eccentric sensitivity between the front and rear lens groups on either side of the stop 2 can be suppressed as compared with the case where the coated surface is formed on a biconvex lens element or a biconcave lens element, the cost of manufacturing the lens element can be reduced.

Two embodiments of the invention will now be set forth in detail.

Embodiment 1

Figure 2:
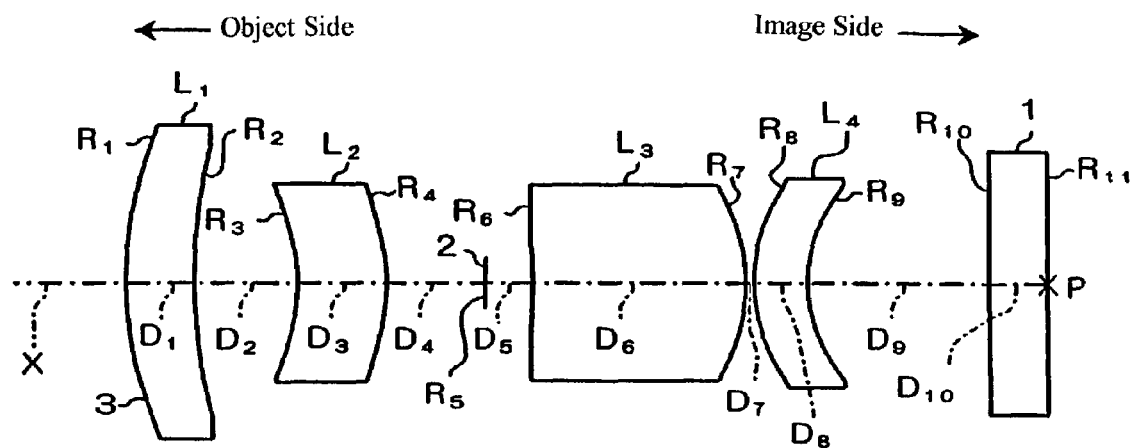
FIG. 2 shows the construction of a single-focus lens for electronic still cameras according to Embodiment 1 of the present invention.

FIG. 2 shows the basic lens element configuration of a single-focus lens according to the first embodiment of the invention. In this embodiment, an infrared-blocking coating is formed on the object side surface 3 of the first lens element $L_1$ which consists of a positive meniscus lens element.

Table 1 below lists the surface number #, in order from the object side, the radius of curvature R (in mm) near the optical axis of each lens surface, the on-axis spacing D (in mm) between surfaces, as well as the values of the refractive index $N_d$ and Abbe number $v_d$ (both at the d line) of each lens element according to Embodiment 1 of the invention. In the bottom portion of the table are listed the focal length f, the F-number $F_{NO}$, and the field angle 2ω. Those surfaces with an asterisk mark to the right of the surface number are aspherical, with a surface contour as defined by the following Equation (1):

$$Z=Ch^2/\{1+(1-KC^2h^2)^{1/2}\}+A_4h^4+A_6h^6+A_8h^8+A_{10}h^{10} \quad \text{Equation (1)}$$

where

Z is the length (in mm) of a line drawn from a point on the aspherical surface at distance h from the optical axis to the tangential plane of the aspherical surface vertex, C(=1/R) is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients, respectively.

TABLE 1

| # | R | D | $N_d$ | $v_d$ |
|---|---|---|---|---|
| 1 | 1.2672 | 0.21474 | 1.84666 | 23.8 |
| 2 | 1.7472 | 0.32888 | | |
| 3* | −0.4666 | 0.27894 | 1.49020 | 57.5 |
| 4* | −0.5653 | 0.30941 | | |
| 5 | ∞ | 0.15086 | | |
| 6 | −2.0764 | 0.67664 | 1.62299 | 58.1 |
| 7 | −0.6013 | 0.02863 | | |
| 8* | 0.4987 | 0.17179 | 1.49020 | 57.5 |
| 9* | 0.4485 | 0.57947 | | |
| 10 | ∞ | 0.18610 | 1.51680 | 64.2 |
| 11 | ∞ | | | |
| | f = 1.00 | $F_{NO}$ = 5.6 | 2ω = 45.8° | |

Table 2 below lists the aspherical constants K, $A_4$, $A_6$, $A_8$, and $A_{10}$ for Equation (1) above of the aspherical surfaces of this embodiment.

TABLE 2

| # | K | $A_4$ | $A_6$ | $A_8$ | $A_{10}$ |
|---|---|---|---|---|---|
| 3 | 1.1431 | 4.9672 | −4.2644 | 5.1480 | 1.3512 × 10² |
| 4 | −0.7219 | 2.6841 | 4.7214 | −1.5257 × 10² | 3.9275 × 10² |
| 8 | −2.4069 | 3.1824 | −17.944 | 10.571 | −36.334 |
| 9 | −1.6567 | 4.7250 | −26.540 | 16.592 | 26.011 |

The values corresponding to Conditions (1) and (2) for the single-focus lens of Embodiment 1 are: Δθa=3.4° and Δθb=4.1°. Thus, both conditions are satisfied.

Embodiment 2

Figure 3:
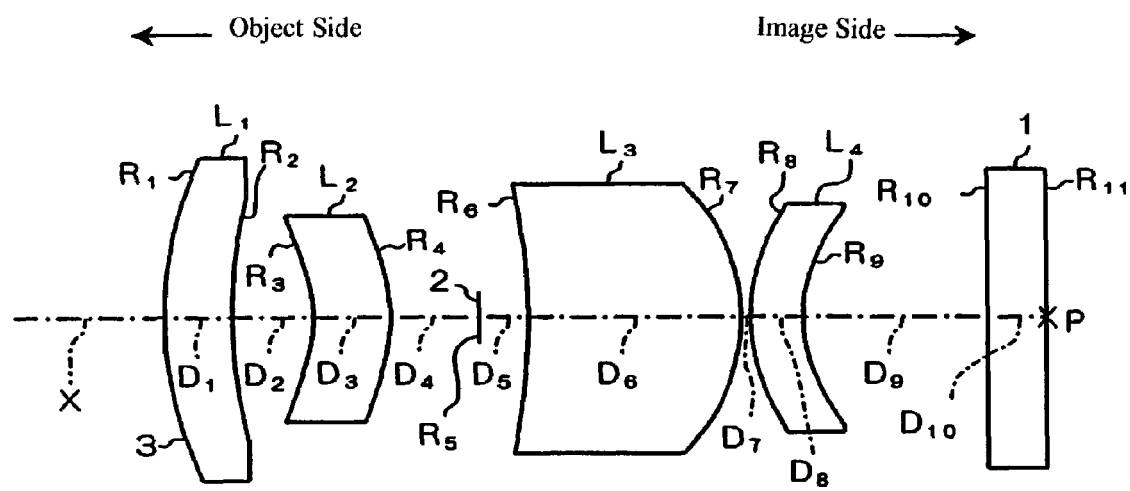
FIG. 3 shows the construction of a single-focus lens for electronic still cameras according to Embodiment 2 of the present invention.

FIG. 3 shows the basic lens element configuration of a single-focus lens according to a second embodiment of the invention, which is similar to that of Embodiment 1. Once again, an infrared-blocking coating is formed on the object side surface 3 of the first lens element $L_1$ which consists of a positive meniscus lens element.

Table 3 below lists the surface number #, in order from the object side, the radius of curvature R (in mm) near the optical axis of each lens surface, the on-axis spacing D (in mm) between surfaces, as well as the values of the refractive index $N_d$ and Abbe number $v_d$ (both at the d line) of each lens element according to Embodiment 2 of the invention. In the bottom portion of the table are listed the focal length f, the F-number $F_{NO}$, and the field angle 2ω. Those surfaces with an asterisk mark to the right of the surface number are aspherical, with a surface contour as defined by Equation (1) above.

TABLE 3

| # | R | D | $N_d$ | $v_d$ |
|---|---|---|---|---|
| 1 | 1.1724 | 0.2145 | 1.84666 | 23.8 |
| 2 | 1.5727 | 0.2566 | | |
| 3* | −0.4309 | 0.2418 | 1.50848 | 56.4 |
| 4* | −0.5138 | 0.2756 | | |
| 5 | ∞ | 0.1627 | | |
| 6 | −1.9621 | 0.6759 | 1.62299 | 58.1 |
| 7 | −0.6005 | 0.0286 | | |
| 8* | 0.5114 | 0.1716 | 1.50848 | 56.4 |
| 9* | 0.4588 | 0.5890 | | |
| 10 | ∞ | 0.1860 | 1.51680 | 64.2 |
| 11 | ∞ | | | |
| | f = 1.00 | $F_{NO}$ = 5.6 | 2ω = 50.8° | |

Table 4 below lists the aspherical constants K, $A_4$, $A_6$, $A_8$, and $A_{10}$ for Equation (1) above of the aspherical surfaces of this embodiment.

TABLE 4

| # | K | $A_4$ | $A_6$ | $A_8$ | $A_{10}$ |
|---|---|---|---|---|---|
| 3 | 1.2342 | 6.0209 | −6.3990 | 31.361 | 3.7418 × 10² |
| 4 | −0.5498 | 2.6051 | 5.3610 | −1.5279 × 10² | 4.3503 × 10² |
| 8 | −2.9140 | 3.1002 | −19.749 | 22.207 | 79.025 |
| 9 | −2.0074 | 4.3944 | −26.639 | 26.483 | 2.3546 × 10² |

The values corresponding to Conditions (1) and (2) for the single-focus lens of Embodiment 2 are: Δθa=4.4° and Δθb=5.6°. Thus, both conditions are satisfied.

FIGS. 4(a)–4(d) show the spherical aberration (in mm), the astigmatism (in mm), the distortion (in %), and the lateral color (in μm), respectively, of the single-focus lens of Embodiment 1, and FIGS. 5(a)–5(d) show the spherical aberration (in mm), the astigmatism (in mm), the distortion (in %), and the lateral color (in μm), respectively, of the single-focus lens of Embodiment 2. In FIGS. 4(a) and 5(a) the spherical aberration is given for each of the C, d, and g lines. In FIGS. 4(b) and 5(b), the astigmatism is shown for both the sagittal (S) image plane and tangential (T) image plane. In FIGS. 4(d) and 5(d) the lateral color is shown for both the C line and the g line. As is clear from these figures, each of these aberrations is favorably corrected for each embodiment of the invention, with the lateral color being especially well-corrected.

The invention being thus described, it will be obvious that the same may be varied in many ways. For example, although both embodiments have a focal length that has been normalized to unity, the values of R and D can be readily scaled to achieve a lens of a desired focal length. Further, the shape of the aspheric surfaces can be appropriately selected, the number of lens elements may be altered, or the position of the stop may be altered. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single-focus lens for an electronic still camera, said single-focus lens comprising:

at least one meniscus lens element that is placed on the object side of a stop, with at least one surface of the meniscus lens element having a curvature such that its surface normals form angles that do not exceed 10 degrees with incident rays that pass through the stop at all field angles; and an infrared-blocking coating is provided on said at least one surface.

2. A single-focus lens for an electronic still camera which satisfies the following Conditions (1) and (2):

$$\Delta\theta a < 6° \quad \ldots \text{Condition (1)}$$
$$\Delta\theta b < 7° \quad \ldots \text{Condition (2)}$$

where $\Delta\theta a$ is the maximum deviation angle, throughout all field angles, between the principal ray of a light flux that is incident onto the lens surface having the infrared-blocking coating thereon and which passes through the stop and a line normal to the same lens surface at the same point of incidence as the principal ray; and $\Delta\theta b$ is the maximum deviation angle between a marginal ray in the central light flux that passes through the stop and is incident onto the lens surface having an infrared-blocking coating thereon and a line that is normal to the same lens surface at the same point of incidence as the marginal ray.

* * * * *

UNITED STATES PATENT AND TRADEMARK OFFICE
CERTIFICATE OF CORRECTION

PATENT NO. : 7,002,757 B2  
APPLICATION NO. : 10/225359  
DATED : February 21, 2006  
INVENTOR(S) : Sato Page 1 of 1

It is certified that error appears in the above-identified patent and that said Letters Patent is hereby corrected as shown below:

Column 2
Line 66, change "with is" to -- with its --;

Column 3
Line 9, change "with I being" to -- with 1 being --;
Line 13, change "surface 3" to -- surface 3) --; and
Line 18, change "angle 10°'" to -- angle of 10° --.

Signed and Sealed this

Twenty-sixth Day of February, 2008

JON W. DUDAS  
*Director of the United States Patent and Trademark Office*